United States Patent Office 3,634,332
Patented Jan. 11, 1972

3,634,332
PROCESS FOR CATALYST MATERIALS OF IMPROVED PORE VOLUME
William Edward Bambrick, Stamford, Conn., assignor to American Cyanamid Company, Stamford, Conn.
No Drawing. Filed Sept. 2, 1969, Ser. No. 854,780
Int. Cl. B01j 11/06, 11/40
U.S. Cl. 252—455 R        11 Claims

ABSTRACT OF THE DISCLOSURE

A process for preparing formed catalyst supports of increased pore volume which comprises forming a hydrogel of a suitable metal oxide, partially drying the formed hydrogel to form a xerogel, reslurrying the xerogel in sufficient water to produce a continuous water phase therein, subjecting the slurry thus formed to sufficient shearing action to eliminate the fluidizing effect of the continuous water phase, extruding the stiffened xerogel slurry, and thereafter drying and calcining the extrudate. Catalysts materials are produced by the preparative process described.

---

The present invention relates to a process for preparing catalyst materials i.e. catalyst supports or base materials as well as final catalysts. More particularly, the present invention relates to a process for preparing formed catalyst materials and, in particular, extrudates from inorganic oxides which extrudates when dried and calcined are characterized by high porosity.

Inorganic metal oxides are widely used as supports in the formation of catalyst materials. Numerous processes are known for the preparation of catalysts and catalyst supports from hydrosols and gels of inorganic metal oxides. Depending upon the type of hydrosol or gel employed as well as the intended utility of the catalyst formed, the process of formation may vary widely, leading to important distinctions in the final catalyst, which distinctions stem from the preparative process. Thus, a particular process for preparation of a catalyst material from a specific metal oxide hydrogel may lead to distinctive utility for such a catalyst, while employment of alternative processes with the same hydrogel or employment of the same process with other hydrogels of the same or different metal oxides may not achieve catalysts of the same utility.

In U.S. Pat. 3,390,100, Chomitz et al., June 25, 1968, there is disclosed a process for preparing formed catalyst materials which comprises forming a hydrogel slurry having a continuous aqueous phase, shearing said slurry to eliminate the fluidizing effects of the continuous aqueous phase, extruding the stiffened slurry, and thereafter drying and calcining the extrudates. The extrudates formed in accordance with the process of this cited patent have a somewhat limited range of pore volumes and, as a result, are of somewhat restricted utility. In catalytic processes wherein dispersed solids, or materials capable of forming dispersed solids are present, the limited pore volume readily becomes plugged reducing the effectiveness of the catalyst materials and requiring frequent catalyst regeneration or replacement. In addition, because of the limited pore volume available, the type and use level of promoters employed as impregnants to increase catalytic activity must be carefully selected so as to minimize loss of pore volume.

In U.S. Pat. 3,403,109, Colgan et al., Sept. 24, 1968, there is disclosed a process for preparing a silica-containing gel having improved pore volume. In the process of extruding this silica-containing gel, however, conditions are employed which lead to reduced pore volume in the extrudates. The process involves preparation of an extrusion feed of high solids requiring intensive mixing or mulling of the gel, repeated extrusions for proper forming, high extrusion torque and slow extrusion rate. The conditions required lead to pore volume in extrudates that is below that initially present in the gel. Although the reference teaches how to obtain a gel of high porosity, it does not teach how to process said gel into extrudates of higher pore volume.

In view of the deficiencies of the prior processes, there is a long-felt need for a process for forming extrudates of catalyst materials which process provides for increased pore volume and minimizes extrusion difficulties.

It has now been discovered that by forming an aqueous gel slurry of from about 4% to about 40% solids containing a continuous aqueous phase, said gel comprising at least some xerogel, shearing said slurry to eliminate the fluidizing effects of the continuous aqueous phase, extruding the stiffened slurry and thereafter drying and calcining the formed extrudates, there is obtained a shaped catalyst material which has greatly improved pore volume over that obtained by other processes. It is surprising that use of xerogels in the feed slurry should result in increased pore volume in the formed extrudate without interfering with processing of the sheared slurry. In preferred embodiments wherein the gel slurried comprises xerogel in major proportions, it is entirely unexpected that the pore volume obtained in the extrudates is greater than that available in the gel being processed. This result suggests that there is present in the process of the present invention a structurizing feature not present in other extrusion processes. The fact that the greatest increase in pore volume over that available in the gel being processed occurs when said gel is solely xerogel indicates that the structurizing feature is attributable to the xerogel present, a highly surprising result in view of the fact that the structure of xerogels is generally considered to be irreversibly set by the drying associated with their formation.

In addition to providing formed catalyst materials of increased pore volume, the present invention offers additional advantages. In U.S. Pat. 3,390,100, cited above, the use of undried hydrogels necessitates either continuous co-production of hydrogel and extrudate at a single location to avoid loss of water from the hydrogel as formed or elaborate handling of the undried hydrogel if separate production of hydrogel and extrudate is contemplated. The process of the present invention, by its ability to handle xerogels alone enables successful production of catalyst materials to be achieved by separate production of hydrogel and extrudate without special handling of the hydrogel to avoid loss of water. Storage of xerogel presents no problems and allows inventory for indefinite periods prior to use in forming extrudates. Additionally, since xerogels may be prepared in a wide range of pore volumes, use of such xerogels singly, in admixture with one another and in combination with hydrogels enables a wide range of porosity to be obtained in formed extrudates. Processing conditions, as discussed below can also be varied to result in augmentation of the range of pore volumes obtainable.

The metal oxide materials, which may contain various promoters, i.e. catalytic metals or oxide precursors, are generally referred to as inorganic oxide gels and may be composed of silica, alumina, magnesia, vanadia, zirconia, and the like, or combinations of these and other inorganic oxides. Thus, silica-alumina, silica-alumina-magnesia, silica-magnesia and various other combinations of inorganic oxide materials are contemplated. This invention is concerned with the use of at least some xerogel preferably based on silica, alumina, and silica-alumina, wherein the silica content is from about 5% to about 40%, preferably 10% to 30%, based on the dry weight of silica-alumina.

The term "hydrogel" as that term is employed herein refers to gels, precipitated gels, hydrous oxide precipitates, or combinations thereof in an undried state and usually washed free of salts resulting from gelation or precipitation reactions. Water is a major component of these materials as formed, comprising 80% to 95% of their weight. The water is held within the pores or interstices of the semi-rigid hydrogel. Thus, hydrogels distinguish from sols and xerogels, the term "sol" referring to colloidal dispersions which are macroscopically homogeneous and opalescent in appearance and are characterized by the flow properties of a true liquid, and the term "xerogel" referring to the product obtained by drying hydrogels whereby the structure is set for the most part irreversibly. While xerogels may contain a residuum of combined water, i.e. as much as 75% by weight, they are usually encountered as spray dried powders containing 65–85% solids and are considered to be rigid solids.

By the term "feed slurry" as it is employed herein is meant a composition of matter which is characterizable as a suspension of particles in a liquid medium, i.e. a mixture having combined water and free water in a continuous water phase, and generally characterizable by non-Newtonian properties.

Inorganic oxide hydrogels are capable of preparation by a variety of techniques well known in the catalyst field.

Silica hydrogels or hydrated silica gels may be prepared by precipitating silica from an alkali metal silicate with a material such as sulfuric acid under conditions of pH, temperature, agitation and the like well known to those skilled in the art.

Where inorganic oxide coated hydrogels are contemplated, such as alumina coated silica gels, such materials may be prepared in accordance with processes described in U.S. Pats. 2,467,314, 2,478,519, 2,701,793 and others, and in the event that inorganic additive materials, as for example various clays such as kaolin, are to be incorporated therewith, procedures such as are described in U.S. Pat. 3,023,172 may illustratively be employed. Typically, silica-magnesia cogels may be prepared according to the process described in U.S. Pat. 2,582,099 or Canadian Pat. 610,679.

Alumina hydrogels may be prepared by precipitation from a water solution of a water-soluble aluminum compound which may be either an aluminum salt such as aluminum sulfate, aluminum nitrate, aluminum chloride and the like or an alkali metal aluminate such as sodium or potassium aluminate or both. Alumina hydrogels may be prepared in accordance with the process described in U.S. Pat. 2,657,115 and by the modified procedures described in U.S. Pats 3,032,514 and 3,086,845 and others.

After the hydrogel has been formed in accordance with the appropriate procedure, it is separated if necessary. from the liquor in which it is formed by filtration, centrifugation or other appropriate method. While it is not necessary to wash the separated hydrogel free of salts at this point, it is generally preferred to do so. The separated hydrogel obtained at this point will contain about 5% to about 20% solids based on the weight after calcination. The specific solids will vary depending upon the inorganic oxide or oxides comprising the hydrogel. If desired, promoters may be incorporated into the hydrogel, preferably into washed hydrogel.

Whether or not the separated hydrogel has been washed, it is next subjected to drying to form xerogel required in the process of the present invention. The extent to which water is removed from the hydrogel during drying will vary widely depending upon the solids content of the hydrogel and the nature of the drying operation conducted. Where, for example, the undried hydrogels have the solids contents previously indicated, drying to increase the solids contents to 23% to 80%, is generally effective. In any event, the hydrous oxide obtained after drying will have most, if not all, of the free water removed and may have some normally associated water removed. It is to be understood that drying of the hydrogels does not have to be complete and further drying or calcination can result in further removal of water.

Once drying of the hydrogel has been effected, the resulting xerogel may be stored indefinitely before conversion into extrudates without the need for special packaging materials. When xerogel is to be employed in conjunction with hydrogel, it is generally preferred to prepare such hydrogel at the time extrusion is contemplated and thus avoid problems of storage of hydrogel.

To produce extrudates in accordance with the process of the present invention, a feed slurry is prepared. This feed slurry may be in part a hydrogel slurry to which is added the desired amount of xerogel or it may consist entirely of xerogel slurried in water. The slurry will generally contain from about 4% to about 40% solids as determined by drying and calcining said slurry. Generally, when alumina coated silica gels are employed the range of solids will be from about 10% to 36%, preferably 15% to 36%, same basis. If desired, promoters may be added to the feed slurry.

In preparing the feed slurry, it should be borne in mind that greater usage of xerogel in the slurry will generally result in larger increases in pore volume. Where the larger increases in pore volume in extrudates of a particular gel is desired, the slurry prepared should be based entirely on xerogel or the amount of hydrogel employed in conjunction with xerogel should be minimized. Where the pore volume desired is intermediate between that obtained with all xerogel in one instance and that obtained conventionally with all hydrogel in another, the use levels of hydrogel and xerogel should be varied accordingly. It is possible among the various metal oxide gels and cogels and mixtures thereof contemplated to detect increases in pore volume by usage of xerogel as low as about 10% by weight of the solids in the feed slurry. Generally, however, it is preferred to employ at least about 50% xerogel solids, and most advantageously, at lease 65% xerogel solids, same basis.

Additional variations in pore volume obtainable in extrudates produced by the process of the present invention can arise from the specific method employed in preparing the hydrogel from which the xerogel is obtained. Thus, certain silica-containing xerogels, for example, can be prepared by alternative procedures resulting in different pore volumes in xerogels of the same metal oxide content. Accordingly, depending upon the pore volume desired, selection of the process for preparation of the hydrogel from which the xerogel is obtained should be appropriately made.

In preparing the feed slurry, suitable agitation is employed to obtain a uniform slurry. This may be accomplished conveniently by use of a high speed agitator operating in conjunction with a recirculating pump of the screw-type. Although this combination of agitation has been found to be eminently suitable for rapidly preparing feed slurries of the present invention, it is to be understood that other types of equipment, alone and in combination, are also useful.

After the feed slurry has been formed as indicated, it is next submitted to intense shearing action. The intense shearing action to which the feed slurry is subjected is that which is sufficient to eliminate the fluidizing effect of the continuous water phase. This intense shearing action converts the pumpable, flowable feed slurry to a semi-rigid material without changing the water to solids ratio of the slurry, apparently as a result of redistribution of its free water content, which water is thought to be primarily responsible for its fluidity. It is thought that intense shearing manages to fix more water within the gel-water system than can be obtained by other methods of agitation and effects a change in rigidity as a result of the redistribution of water.

The intense shearing or comminution of the feed slurry is accomplished by passing the feed slurry through a homogenizer, as for example an ordinary spring-pressed or spring-loaded homogenizing valve. In the present specification the extent of shearing or comminution, insofar as it can be defined numerically, will be defined as that degree corresponding to homogenization obtained by passing the xerogel feed slurry through such a valve at a defined pressure drop.

An accurate and general method for determining whether or not the feed slurry has been rendered sufficiently rigid by the shearing action is to determine whether or not extrudates formed from material so processed, when in the form of a fresh extrudate of from about $1/32$ to about $3/8$ inch diamter, will be free from substantial deformation under its own weight prior to drying and calcination. Thus, extrudates formed from such materials properly sheared when placed on their sides do not tend to flow, become excessively flattened, or lose their as-extruded cross-section. It has been determined that this degree of shear will normally be produced by a pressure drop of at least 2000 pounds per square inch (p.s.i.) and preferably 3000 p.s.i. on an ordinary spring-loaded homogenizer, as for example a Manton-Gaulin 15 gallons per hour, 8000 p.s.i., homogenizer.

Variations in ultimate pore volume of extrudates can be effected by the nature of processing conditions selected. A significant influence on pore volume can be effected by choice of shearing pressure. Although the minimum shearing pressure required to process the feed slurry is as defined above, the actual shearing pressure employed may vary widely above this minimum value while still providing increases in pore volume. However, in order to obtain maximum pore volume increase in accordance with the process of the present invention, it is necessary to minimize shearing pressure.

After subjection of the feed slurry to the defined shearing action, the stiffened slurry is then extruded as through an orifice of from about $1/32$ inch to about $3/8$ inch diameter. Extrusion is accomplished by use of residual pressure from the homogenizer to force the sheared slurry through the extrusion orifice.

It is believed that the combination of factors resulting from use of a homogenizer to effect shearing and use of residual pressure from the homogenizer to force the sheared slurry through the extrusion orifice is responsible for the structurizing feature which produces extrudates having higher pore volume than is available in the xerogel being processed. It is not understood how the structurizing feature is possible, however, in view of the fact that the structure of xerogels is generally thought to be irreversibly and rigidly set.

After extrusion, the extrudates are dried and calcined. Normally in drying operations temperatures of from about 150 to about 350° F. are employed.

Subsequent to drying, the extrudates, which will contain from about 50% to about 15% of water, are calcined, typically at temperatures up to about 900–1200° F., where they are maintained for periods of time up to about an hour and the inorganic metal oxides are activated.

It should be noted that, in general, undesirable ions, such as alkali metal ions, sulfate ions, etc., should be absent or reduced to acceptable minimums in the calcined extrudates or catalyst materials. This can be accomplished by washing the hydrogel filter cake, the xerogel prior to or in conjunction with preparation of feed slurry, or the dried and calcined extrudates. Thus, if provision has not previously been made for washing the gel material, it may be washed subsequent to drying and calcination of the extrudates.

In using the extrudates as catalysts, it will be appreciated that either the hydrogel slurry or xerogel-containing feed slurry or both may have promoters incorporated therein. The calcined extrudates may alternatively or additionally be impregnated with promoters in accordance with procedures well known to those skilled in the art. When promoters are incorporated in the hydrogel slurry or xerogel-containing feed slurry, their presence does not significantly affect subsequent processing steps in preparation of extrudates according to this invention.

The extrudates of the present invention, depending upon their composition, may be employed as cracking catalysts for fixed or moving beds, particularly where the extrudates contain silica-alumina, silica-magnesia, and other compositions known to be useful as cracking catalysts. In addition, the extrudates may contain certain metals or metal oxides as promoters useful for effecting such reactions as isomerization, hydrogenation, reforming, hydrocracking, and hydrodesulfurization and the like. Metals and metal oxides which may be used alone or in combination with one or more metals or their oxides include Group I–B metals including copper, silver, and the like, Group V–B metals such as vanadium, Group VIII metals such as platinum, palladium, rhodium nickel, cobalt, and the like, and transition metal oxides of Group VI–B such as oxides of chromium, molybdenum, tungsten, and the like. Additionally, halogens such as chlorine and fluorine serve as promoters in certain reactions.

As is well known, promoters of the general type described above are present in the final catalyst composition in amounts to render them suitable for the particular end use. In general, a promoter or combination of promoters may constitute amounts of from about 0.01 to about 40% by weight of the final catalyst composition.

The extrudate catalyst materials of the present invention have increased pore volume over that obtained in similar catalyst materials prepared by other methods. As such, they are eminently suitable for those catalytic operations wherein solids are present or precipitate during the reactions. The increased pore volume of the catalysts of the present invention allow them to be kept in service for longer operating periods than conventional catalysts before becoming plugged. In addition, their increased pore volume enables them to be treated with greater amounts of promoters than conventional catalyst materials and, as a result, they can be more effective in operation. In addition, by virtue of their increased pore volume, the catalyst materials obtained by the process of the present invention can be treated with promoters not normally considered for use with conventional catalyst materials of this type because of the difficulties associated with rendering said promoters present in sufficient quantity to give good activity and prevent substantial initial plugging of pore volume. Thus, the process of the present invention provides considerable advances in the field of formed catalyst materials, particularly as it relates to extrudates.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

In the following examples, reference is made to physical properties such as pore volume, surface area, and the like. In general, these are determined in accordance with the description given in the booklet Test Methods for Synthetic Fluid Cracking Catalyst, American Cyanamid Co., January 1957. Crush strength is determined by placing an extrudate on its side between two parallel plates. Force is applied to the bottom plate by means of pneumatic pressure until the extrudate is crushed. The device is such that the air pressure in pounds per square inch to cause crushing is the crush strength of the extrudate in pounds.

EXAMPLE 1

A precipitated alumina hydrogel slurry is prepared in the following manner:

3480 parts of aluminum sulfate solution containing 8% $Al_2O_3$ and 2310 parts of a 26% $Al_2O_3$ solution of sodium aluminate are introduced simultaneously into a suitably agitated strike tank containing 12,500 parts of water precipitate alumina hydrogel at pH of 7–7.5. The pH is then adjusted to 10.5 by the addition of excess sodium aluminate and the alumina hydrogel is filtered and washed at pH 10.5 to reduce the soda and sulfate content to below 0.5%.

The filter cake is repulped and filtered at pH 7–8 to reduce the soda content to below 0.02%.

The filter cake thus prepared is repulped to 17.2% solids. A portion of the resulting slurry is retained and the balance is pumped into a spray dryer where it is dried at an inlet air temperature of 800° F. and at a rate of 6 pounds of slurry per minute. The xerogel resulting from spray drying has a pore volume of 1.04 cc./gram when calcined. The spray dried xerogel has a solids content of 67.1% based on the weight after calcination.

EXAMPLE 2 (COMPARATIVE)

A portion of the hydrogel slurry retained in Example 1 is subjected to shearing by being passed through a Manton-Gaulin homogenizer (size 15 gallons per hour) at various pressures. The sheared slurry is then passed through an extrusion header having openings of 0.095 inch diameter. The extrudates thus formed are dried and then calcined. Various physical properties obtained on the extrudates are reported in Table I, which also indicates the homogenization pressures employed.

TABLE I.—EXTRUDATES FROM HYDROGEL SLURRY

| Homogenization pressure (p.s.i.) | Pore volume (cc./gram) | Diameter (inch) |
| --- | --- | --- |
| 2,500 | 0.48 | .048 |
| 3,500 | 0.46 | .049 |
| 4,500 | 0.45 | .051 |
| 6,000 | 0.45 | .051 |

The example shows the low pore volume obtained in extrudates formed from an alumina hydrogel which when dried to form a xerogel has a considerably larger pore volume.

EXAMPLE 3

Separate portions of the hydrogel slurry retained in Example 1 are used to prepare feed slurries in which the xerogel of Example 1 is incorporated in various proportions as follows:

| | Parts | | | Solids (percent) |
| --- | --- | --- | --- | --- |
| | Hydrogel | Xerogel | Water | |
| A | 11.9 | 30.6 | 57.5 | 22.6 |
| B | 21.2 | 27.2 | 51.6 | 21.9 |
| C | 28.8 | 24.6 | 46.6 | 21.5 |

The feed slurries thus prepared are then processed into extrudates following the procedure of Example 2. Each slurry is processed at shearing pressures of 3500 and 6000 p.s.i. Properties of the calcined extrudates thus obtained are given in Table II.

TABLE II.—EXTRUDATES FROM HYDROGEL-XEROGEL SLURRIES

| Slurry employed: | Homogenization pressure (p.s.i.) | Pore volume (cc./gram) | Diameter (inch) |
| --- | --- | --- | --- |
| A | 3,500 | 1.65 | .074 |
| A | 6,000 | 1.52 | .071 |
| B | 3,500 | 1.62 | .075 |
| B | 6,000 | 1.52 | .075 |
| C | 3,500 | 1.57 | .073 |
| C | 6,000 | 1.42 | .075 |

Comparison of the values of pore volume in Tables I and II clearly indicate the outstanding increases in pore volume obtained by the process of the present invention. It is to be especially noted that the extrudates of this example have pore volume in excess of that available in the calcined xerogel, thus illustrating the structurizing feature of the process of the present invention.

EXAMPLE 4

The xerogel of Example 1 is processed into a feed slurry of 23% solids by use of a high-speed stirrer acting in conjunction with a screw-type recirculating pump.

The feed slurry is then processed into extrudates following the procedure of Example 2, except for the lower homogenization pressure. Properties of the calcined extrudates are given in Table III.

TABLE III.—EXTRUDATES FROM XEROGEL SLURRY

| Homogenization pressure (p.s.i.) | Pore volume (cc./gram) | Diameter (inch) |
| --- | --- | --- |
| 3,500 | 1.66 | 0.079 |
| 4,500 | 1.64 | 0.077 |
| 6,000 | 1.58 | 0.076 |

Comparison of the values of pore volume in Tables I and III again clearly indicate the outstanding increases in pore volume obtained by the process of the present invention. Again, it is to be noted that the extrudates of this example have pore volume in excess of that available in the xerogel being processed.

EXAMPLE 5

Nine thousand pounds of a dilute salt solution containing about 135 pounds of sodium sulfate is charged to a tank fitted with a turbine agitator. To this solution is added 2030 pounds of commercial silicate of soda solution (41° Bé., 28.5% $SiO_2$, 9% $Na_2O$). The resulting dilute solution is then heated to about 135° F. and then acidified by adding a 25% solution of sulfuric acid over about a 15 minute period to bring the solution pH to about 2.5–3.0. An additional 2030 pounds of silicate is then added followed by additional 25% sulfuric acid solution added over a 15 minute period to bring the pH to about 8.0–8.5. Agitation is then stopped and the mix is aged for one hour at about 140° F. prior to coating with alumina by adding solutions of aluminum sulfate and sodium aluminate to produce a composition which on a dry, salt-free basis is approximately 25% $Al_2O_3$ and 75% $SiO_2$. After filtering and washing to remove salts, a portion of the hydrogel is retained and the balance of the gel is spray dried as described in Example 1.

The resulting xerogel has a solids content of 85% and when calcined exhibits a pore volume of 1.6 cc./gram.

EXAMPLE 6 (COMPARATIVE)

A portion of the hydrogel retained in Example 5 was reslurried to produce a feed slurry of 17.5% solids. The slurry is pumped to a homogenizer and subjected to the shearing force produced by a pressure drop of 3000 p.s.i. The feed slurry is thus thickened to a stiff paste and residual pressure from the homogenizer is used to force the stiff paste through a multiport extruder in a manner so as to achieve uniformity of flow through individual ports 0.095 inch in diameter.

The resulting cylindrical strands are formed as a loose bed on a perforated belt of a continuous drier with air circulation throughout. The strands are raised to 70–80% solids during a drying stage at an inlet air temperature of 250° F. and thereafter the extrudates are calcined at a temperature of 1100° F. for one hour.

Properties of the calcined extrudates are given in Table IV.

EXAMPLE 7 (COMPARATIVE)

A portion of the xerogel obtained in Example 5 is extruded following the procedure of Example III–5 of U.S. Pat. 3,403,109, cited above.

Properties of the calcined extrudates are given in the Table IV.

EXAMPLE 8

A portion of the xerogel obtained in Example 5 is prepared as a 17.5% solids feed slurry in accordance with the procedure of Example 4. Separate portions of the feed slurry are then pumped to a homogenizer and subjected to the shearing force produced by a pressure drop of 3000 and 6000 p.s.i. in separate runs. In each run the feed slurry is thickened to a stiff paste and residual pressure from the homogenizer is used to force the stiff paste through a multiport extruder in a manner so as to achieve uniformity of flow through individual ports 0.095 inch in diameter.

Drying and calcination of the extrudates is as in Example 6.

Properties of the calcined extrudates are given in Table IV, which follows.

TABLE IV.—PROPERTIES OF EXTRUDATES

| Extrudate of example | Homogenizing pressure (p.s.i.) | Pore volume (cc./gram) | Crush strength/length (lbs./in.) |
|---|---|---|---|
| 6 (comparative) | 3,000 | 1.39 | 53 |
| 7 (comparative)[1] | | 1.12 | 68 |
| 8 (this invention) | 3,000 | 1.93 | 54 |
| 8 (this invention) | 6,000 | 1.81 | 67 |

[1] Homogenization not employed. Extrudation on mulled xerogel of 33.5% solids is at a torque of 28 and a rate of 20 lbs./min. The extruder has a 3.5 inch diameter auger. The torque is that necessary to rotate the auger at 50 r.p.m.

The data show the high values of pore volume obtained in extrudates processed according to the present invention compared to that obtained in extrudates processed by conventional procedures. It is to be noted that at either homogenization pressure, extrudates of the process of the present invention have higher pore volume than is obtainable in the xerogel processed (1.6 cc./gram). The data also indicate that crush strength values are comparable. Further, the data show that as homogenization pressure is increased in the process of the present invention, pore volume tends to decrease to some extent and crush strength tends to increase.

EXAMPLE 9

A precipitated alumina xerogel is prepared following the procedure of Example 1. The xerogel obtained shows a pore volume of 0.81 cc./gram after calcination and a solids content of 67.1% based on the weight after calcination.

In a separate preparation, to 780 parts of water at 140° F. are added 245 parts of sodium silicate (28.5% $SiO_2$ and 8.9% $Na_2O$), giving a solution at 130° F. having a pH of 11.0. The solution is heated to 135° F. and 25% aqueous sulfuric acid is added slowly under agitation until gelation is noted, the pH being 10.3 at this point. Acid addition is then temporarily stopped to enable agitation to break up the gel. Acid addition is then resumed until a pH of 8.2 is reached. At this point acid addition is again stopped, agitation is curtailed and the gel is allowed to age for about 30 minutes. Approximately 124 parts of 25% acid have been added up to this point.

After ageing, the acid addition is resumed with agitation until a pH of 3.6 is obtained. The gel is then diluted with 450 parts of water at 135° F. and approximately ½ part of bone glue is added as a filtration aid. The amount of 25% acid used in the preparation totals 142 parts.

The silica gel slurry thus obtained is washed and filtered on a rotary vacuum filter wheel. The filter cake is slurried with water and adjusted from pH 4.5 to pH 3.3 with dilute nitric acid. An additional ¼ part of bone glue is added and the slurry is washed and filtered as before. The filter cake is again slurried with water and filtered as before, except that pH adjustment is unnecessary. The filter cake is spray dried as described in Example 1. The xerogel obtained has a pore volume of .95 cc./gram when calcined and a solids of 88.9% based on the weight after calcination.

20 parts of the alumina xerogel and 3.75 parts of the silica xerogel are mixed with 25.5 parts of water by use of a high-speed stirrer acting in conjunction with a screw-type recirculating pump to prepare a feed slurry of 36% solids. The feed slurry is subjected to shearing and extruded as described in Example 2 except that the homogenizer pressure is 4500 pounds per square inch.

The extrudates are dried in an oven at 250° F. for about 16 hours. The dried extrudates are calcined at 950° F. for one hour and exhibit the following properties:

pore volume=1.025 cc./gram
diameter=0.077 inch
crush strength/length=43 lbs./inch
$SiO_2$ content=19.9%

This example illustrates use of a mixture of xerogels of different metal oxide contents in preparing extrudates. It is to be noted that the pore volume of the extrudate is greater than that of the xerogels employed, again illustrating the structurizing feature of the process of the present invention.

EXAMPLE 10

A precipitated alumina xerogel as described in Example 9 is employed.

A silica hydrogel slurry is prepared employing a filter cake obtained as described in Example 9 just prior to spray drying. The silica slurry has a solids content of 6.9%.

9 parts of alumina xerogel and 21.75 of silica hydrogel slurry are mixed with 11 parts of water, employing a high-speed agitator in conjunction with a screw-type recirculating pump, producing a feed slurry of 20% solids. The feed slurry is processed into extrudates following the procedure of Example 9.

The extrudates are dried and calcined as described in Example 9 and exhibit the following properties:

pore volume=1.28 cc./gram
diameter=0.064 inch
crush strength/length=34 lbs./inch
$SiO_2$ content=19.9%
ratio hydrogel solids to xerogel solids=0.2

This example illustrates use of a xerogel of one metal oxide content in conjunction with a hydrogel of a second metal oxide content. The pore volume obtained in the extrudates is greater than that available in the xerogel (0.81 cc./gram) and the hydrogel (0.94 cc./gram).

EXAMPLE 11

500 parts of water at 128° F. are added to an agitated reactor and 180 parts of sodium silicate (28.5% $SiO_2$ and 8.9% $Na_2O$) are subsequently added. The resulting solution has a pH of 10.8 and is at 113° F. 25% aqueous sulfuric acid is added at a rate which causes gelation in about 10 minutes. At this point the pH to 10.4 and acid addition is halted temporarily to enable the agitation to fluidize the gel. After about 3 minutes acid addition is resumed and continued until the pH is 9.0. Acid addition is again halted and after 12 minutes the pH rises to 9.6. Acid addition is again resumed and continued until the pH is 7.5. A total of 120 parts of 25% sulfuric acid is added.

50 parts of alum dissolved in 65 parts of water at 128° F. are added to the reactor over a 10 minute period bringing the pH to 3.0 and the temperature to 105° F. Sodium aluminate solution, prepared by reacting 13 parts of bauxite ore concentrate (65% $Al_2O_3$) with 11 parts sodium hydroxide in 10 parts water, is added to the reactor causing the pH to rise to 4.9 and alumina to precipitate.

The resulting alumina coated silica gel slurry is then washed and filtered on a rotary vacuum filter wheel. The washed filter cake is repulped with water and again filtered and washed. The second filter cake is repulped with water and the pH is adjusted from 3.9 to 8.5 by addition of ammonium hydroxide solution of 14% NH₃ content. The repulped slurry is aged for 45 minutes during which time additional ammonium hydroxide solution is added to maintain the pH at 8.5. The slurry is then filtered and washed as before and a portion of the washed filter cake is spray dried at a nozzle pressure of 620 pounds per square inch and an inlet temperature of 825° F. The spray dried powder has a pore volume of 0.92 cc./gram when calcined.

An alumina hydrogel slurry is prepared as described in Example 1, except that the hydrogel when dried and calcined exhibits a pore volume of 0.81 cc./gram. To 36.25 parts of the alumina hydrogel slurry of 15.2% solids is added 2.5 parts of the alumina coated silica xerogel of 83% solids. The feed slurry is processed by means of a high-speed stirrer and a screw-type recirculating pump and contains 20% solids. The feed slurry is then sheared and extruded in accordance with the procedure described in Example 8. The extrudates are dried for 16 hours at 250° F. and calcined at 950° F. for one hour.

Comparative extrudates are prepared using the alumina hydrogel slurry described above and a hydrogel slurry prepared from the retained portion of filter cake obtained in the preparation of the alumina-coated silica gel described above. The alumina hydrogel is of 15.2% solids and is employed at 36.25 parts. The alumina-coated silica hydrogel filter cake is repulped at 17.45% solids and is used at 20 parts. The feed slurry thus obtained is sheared and extruded as before. The extrudates are also dried and calcined as before. Properties of the extrudates of both runs are given in Table V.

TABLE V

Extrudate pore volume

| Example: | Pore volume, cc./gram |
| --- | --- |
| 11 | .91 |
| Comparative | .58 |

This example shows the improved pore volume obtained by use of xerogel in a feed slurry compared to that obtained by use of a feed slurry containing only hydrogels. The example also shows that the process of the present invention is effective with an alumina-coated silica xerogel used in conjunction with an alumina hydrogel.

I claim:
1. A process for preparing formed catalyst materials of increased pore volume which comprises;
    (a) preparing a feed slurry of an inorganic metal oxide gel having a continuous water phase and a solids content of from about 4% to about 40% based on the weight of the calcined metal oxide, said gel comprising at least about 10% solids of a xerogel based on the total solids of gel,
    (b) homogenizing said feed slurry at a pressure drop of at least about 2000 lbs. per square inch to eliminate the fluidizing effects of the continuous water phase and produce a stiffened slurry,
    (c) extruding said stiffened slurry through an orifice of from about 1/32 inch to about 3/8 inch diameter by use of residual pressure from said homogenization and
    (d) thereafter drying and calcining said extrudate.

2. The process of claim 1 wherein the xerogel content is at least about 50% solids based on the total solids of the gel.

3. The process of claim 1 wherein the xerogel content is at least about 65% by weight based on the total solids of the gel.

4. The process of claim 1 wherein the gel is composed entirely of a xerogel.

5. The process of claim 1 wherein said xerogel has a metal oxide content different from the remaining gel solids.

6. The process of claim 1 wherein said xerogel is a coated gel.

7. The process of claim 1 wherein said xerogel is of a single metal oxide and the remaining gel is a coated gel.

8. The process of claim 6 wherein the remaining gel is a coated gel.

9. The process of claim 6 wherein the coated gel is silica-alumina.

10. The process of claim 4 wherein said gel comprises silica-alumina.

11. The process of claim 4 wherein said gel comprises precipitated alumina.

References Cited

UNITED STATES PATENTS

| 3,390,100 | 6/1968 | Chomitz et al. | 252—455 |
| 3,403,109 | 9/1968 | Colgan et al. | 252—451 |
| 3,118,845 | 1/1964 | Innes et al. | 252—453 |

DANIEL E. WYMAN, Primary Examiner

C. F. DEES, Assistant Examiner

U.S. Cl. X.R.

252—463